United States Patent [19]
Tobias

[11] Patent Number: 5,485,268
[45] Date of Patent: Jan. 16, 1996

[54] MULTIPLEX SPECTROSCOPY

[76] Inventor: Reginald Tobias, 822 Langen Rd., Lancaster, Mass. 01523

[21] Appl. No.: 33,339

[22] Filed: Mar. 18, 1993

[51] Int. Cl.$^6$ .................................. G01J 3/06; G01J 3/32
[52] U.S. Cl. ...................... 356/310; 356/326; 356/328
[58] Field of Search ................................. 356/303, 328, 356/330, 310, 326, 334

[56] References Cited

U.S. PATENT DOCUMENTS

| | | | |
|---|---|---|---|
| 3,700,890 | 10/1972 | Kruezer | 356/432 |
| 5,200,796 | 4/1993 | Lequime | 356/346 |
| 5,239,174 | 8/1993 | Klein et al. | 356/328 |
| 5,285,254 | 2/1994 | De Sa | 356/308 |
| 5,303,165 | 4/1994 | Ganz et al. | 356/328 |

Primary Examiner—Robert P. Limanek
Assistant Examiner—David B. Hardy
Attorney, Agent, or Firm—George E. Kersey

[57] ABSTRACT

Method and apparatus for analyzing energy emanating from a source by converting energy from the source into spectral components distributed according to frequency along a flat field, combining the spectral components into a beam, detecting the beam which combines the spectral components and demodulating the spectral components.

17 Claims, 5 Drawing Sheets

MULTIPLEX SPECTROSCOPY

BACKGROUND OF THE INVENTION

This invention relates to the detection of multiple optical frequency constituents emanating from a source, and more particularly, to multiplex spectrometry for the simultaneous detection of multiple frequencies constituents.

In spectrometry the spectral components emitted by bodies and substances are observed using a spectroscope. The spectral components can be separated from one another on a frequency basis. This separation can take place using a grating in which a series of very fine grooves are used to disperse incident electromagnetic energy.

Standard concave grating spectrometers admit electromagnetic energy in the form of light from a source through a small aperture and focus the spectrum on a suitable surface. For standard ruled concave gratings, the surface is called a "Rowland Circle". The surface is a flat focal plane in the case of flat-field holographic, stigmatic holographic or specially ruled concave gratings.

Standard plane grating spectrometers also admit light from a source through a small aperture. A mirror or lens then collimates the light, which illuminates a plane grating that initially disperses the spectrum largely onto a focusing mirror, followed by focusing onto a flat focal plane. A single small aperture may then be used with a single detector and the grating turned in order to sequentially produce monochromatic light of varying wave lengths at the aperture.

Conventionally, small apertures and single detectors are placed on the Rowland Circle for specific wavelengths of interest, or for flat-field holographic gratings, array detectors with many closely spaced detectors are placed on a flat focal plane. The array detectors allow the whole spectral range of interest to be observed simultaneously through electronic multiplexing. These array detectors may also be used with plane grating spectrometers, but will generally cover only small segments of the total spectrum.

Array detectors have found to be advantageous in applied spectroscopy. They allow rapid acquisition of the complete spectrum, since they employ parallel rather than sequential data acquisition. In addition, there often is an enhanced signal-to-noise advantage with multiplexing. Array detectors also can eliminate the need for moving parts in the spectrometer system, resulting in reduced cost and improved life and durability.

Array detector technology for the visible region of the spectrum has advanced rapidly because of the demand for similar types of devices created by telecommunications. Such detectors have been based on silicon light detection over the spectrum ranging from deep ultraviolet (200 nm wavelength) close to the near infrared (1100 nm wavelength). Silicon light detectors perform well and are relatively inexpensive with a cost ranging from tens to hundreds of dollars.

Array detectors which are useful in the near and mid-infrared region of the spectrum have been developed for military use in smart weapons. While military arrays would be useful for general spectroscopy, their complexity makes them unsuitable for mass manufacturing. The spectroscopes that have been designed on the basis of military technology are low quality and are extremely expensive, each costing thousands to tens of thousands of dollars.

Accordingly, it is an object of the invention to facilitate spectroscopy. A related object is to facilitate spectroscopy in the frequency ranges where conventional methods have proved to be inadequate or too costly.

A further object of the invention is to eliminate the need for array detectors in spectroscopy, while realizing the advantages of array detection.

Another object of the invention is to avoid the need for complex gratings in facilitating spectroscopy where conventional methods have proved inadequate. A related object is to use plane grating spectrometers to achieve performance comparable to more complex spectrometers. A further object is to use plane grating spectrometers, without the need for array detectors and the disadvantage of such detectors in generally covering only small segments of the total spectrum.

SUMMARY OF THE INVENTION

In accomplishing the foregoing and related objects, the invention makes use of the reversibility of optical systems and illuminates what would be the focal plane in a conventional system with the homogeneous light from the source. The system accepts at each point on the focal plane only the wavelength of light corresponding with that point, i.e., if wavelength "A" had been focused at position A in a conventional system, then only wavelength "A" will be accepted by the system in reverse, and be focussed only at the conventional entrance aperture, which becomes the exit aperture of the invention. Hence, the system recombines all wavelengths present at the focal plane into a single beam at the new exit aperture.

In accordance with another aspect of the invention, a modulator such as a chopper wheel is placed at the focal plane so that a set of apertures of width equal to an array pixel (single detector) is spaced in a row close together after the fashion of an array detector. Each wavelength position of apertures has a different number of apertures per revolution as the chopper wheel rotates. Consequently, each wavelength arrives at the exit aperture modulated at a different frequency, and a relatively inexpensive single detector may be placed at the new exit aperture. The combined signal is demodulated into separate wavelength signals using standard synchronous demodulation techniques.

In accordance with a further aspect of the invention, harmonics are avoided by structuring each chopper aperture to generate a pure sine wave as it passes over the associated focal plane aperture. This eliminates any cross talk due to chopping harmonics and allows a greater selection of the number of apertures and chopping frequencies.

DESCRIPTION OF THE DRAWINGS

Other aspects of the invention will become apparent after considering several illustrative embodiments, taken in conjunction with the drawings in which.

DETAILED DESCRIPTION

Figure 1:
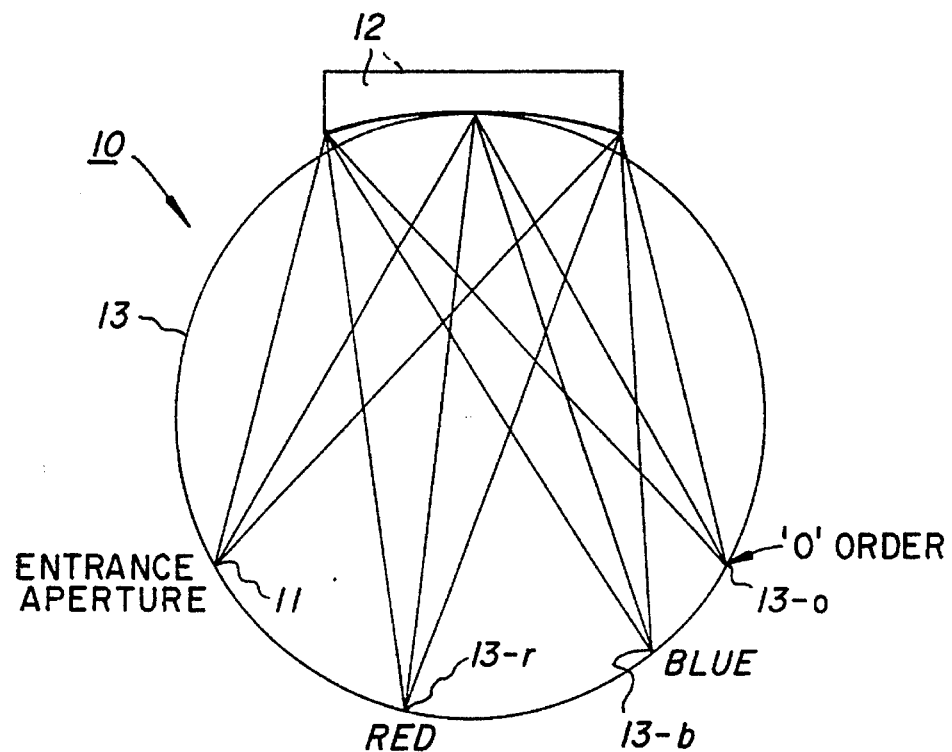
FIG. 1 is a schematic diagram of a spectrometer of the prior art using a "Rowland Circle" focal plane.

With reference to the drawings FIG. 1 shows a standard concave grating spectrometer 10 which admits electromagnetic energy in the form of light from a source through a small entrance aperture 11. The light is applied to a ruled grating 12, which disperses the spectral components of the incoming energy and focuses them on a suitable surface 13. For the ruled concave grating 12, the focal surface 13 is called a "Rowland Circle". Because of, the dispersion of the spectral components on the focal circle 13, the lowest frequency, longest wavelength components are closest to the entrance aperture 11. Thus the "red" frequency components appear at position 13-r on the Rowland Circle. Higher frequency components appear farther along the surface 13, away from position 13-r. Thus the higher frequency, shorter wavelength "blue" components appear at position 13-b. The specular white light of "0" order appears at position 13-o.

Conventionally, small apertures and single detectors (not shown) are placed on the Rowland Circle 13 for specific wavelengths of interest. This procedure has the disadvantage of requiring many single detectors, and is less favored than the spectrometer 20 of FIG. 2.

Figure 2:
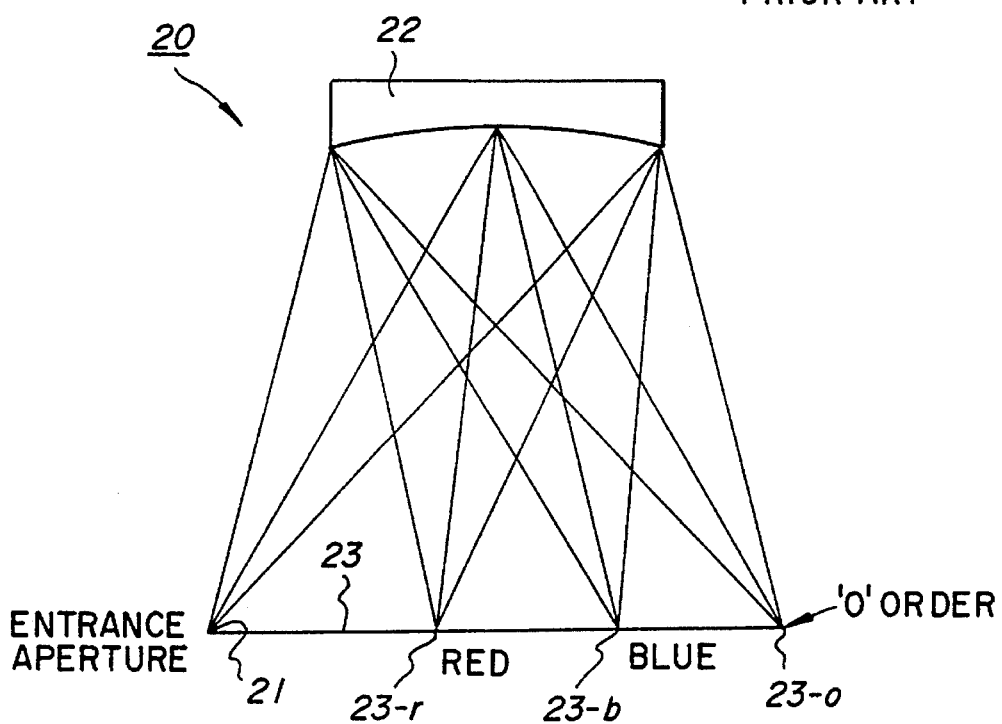
FIG. 2 is a schematic diagram of a spectrometer of the prior art using a flat-field or stigmatic flat-field holographic or ruled grating of the prior art and a flat or planar focal plane.

Where, as shown in FIG. 2 for the spectrometer 20, a flat-field or stigmatic concave grating 22 is used, the focal surface 23 is a flat focal plane. Electromagnetic energy in the form of light from a source (not shown) enters through a small entrance aperture 21. The light is applied to the grating 22, which disperses the spectral components of the incoming energy and focuses them on the flat focal plane 23. Because of the dispersion of the spectral components on the focal plane 23, the lowest frequency, longest wavelength components are, again, closest to the entrance aperture 21. Thus the "red" frequency components appear at position 23-r on the focal plane 23. Higher frequency components appear farther along the surface 23 away from position 23-r. Thus the higher frequency, shorter wavelength "blue" components appear at position 23-b. The white light of "0" order appears at position 23-o.

While small apertures and single detectors can be placed on the focal plane 23 for specific wavelengths of interest, it is preferable to use array detectors (not shown), with many closely spaced detectors are placed along the flat focal plane 23. Array detectors allow the whole spectral range of interest to be observed simultaneously. Array detectors have found to be advantageous in applied spectroscopy because they allow rapid acquisition of the complete spectrum, by employing parallel rather than sequential data acquisition. In addition, there is an enhanced signal-to-noise due to the multiplex advantage. Array detectors also can eliminate the need for moving parts in the spectrometer system, resulting in reduced cost and improved life and durability.

Array detector technology for the visible region of the spectrum has advanced rapidly because of the demand for similar types of devices created by telecommunications. Such detectors have been based on silicon light detection over the spectrum ranging from deep ultraviolet (200 nm wavelength) close to the near infrared (1100 nm wavelength). Silicon light detectors perform well and are relatively inexpensive with a cost ranging from tens to hundreds of dollars.

Array detectors which are useful in the near and mid-infrared region of the spectrum have been developed for military use in smart weapons. While military arrays would be useful for general spectroscopy, their complexity makes them unsuitable for mass manufacturing. The spectroscopes that have been designed on the basis of military technology are low quality and are extremely expensive, each costing thousands to tens of thousands of dollars.

Figure 3:
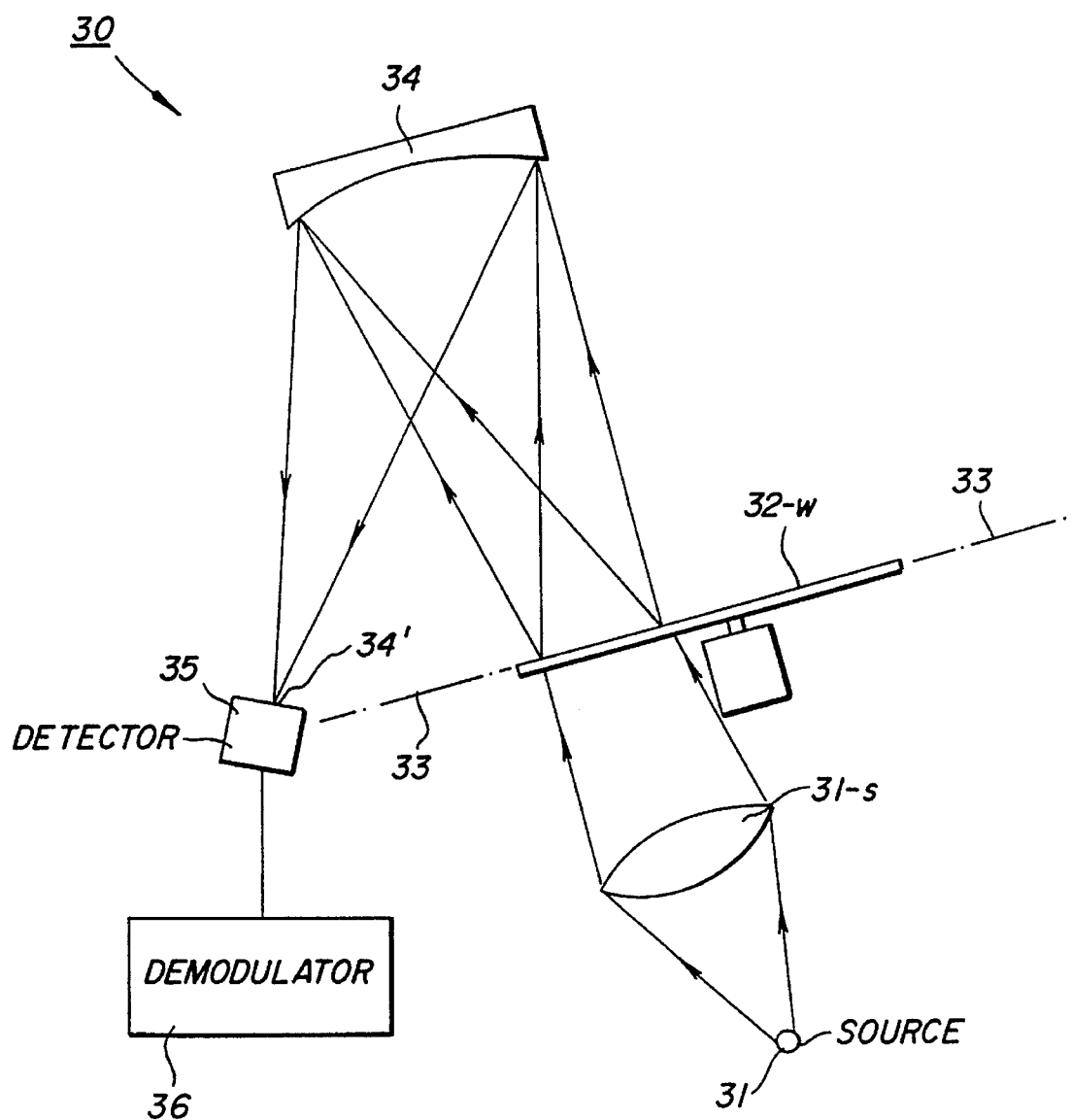
FIG. 3 is a schematic diagram of a spectrometer in accordance with the invention.

To permit the same quality of spectral detection that is achieved by array detection, without the need for array detection, while expanding spectral detection beyond the capability of array detection, the invention provides a spectrographic system 30 of the kind shown in FIG. 3.

In the system 30, light or other electromagnetic energy from a source 31 is applied through a collecting optic 31-s to a chopper, with a chopper wheel 32-w positioned at a flat field 33 that would be a focal plane in conventional spectroscopy with the grating 34.

Because of the structure of the chopper wheel 32-w, as discussed below in conjunction with FIG. 4, spectral components appear at positions along the flat field 33 corresponding to positions shown on the focal plane 23 of FIG. 2. Thus "red" components are extracted from the broadband radiation at a position, and "blue" components are extracted from the broad-band radiation at a position. These components are combined at the grating 34 and reflected to a single detector 35, which, in turn, is connected to a demodulator 36. The demodulator 36 can use the known fast Fourier transform (FFT) technique, or the known synchronous demodulation technique.

As can be seen by comparing FIGS. 1 and 2 with FIGS. 3 and 4, the invention makes use of the reversibility of optical systems and illuminates what would be the focal plane 33 in a conventional system with homogeneous broadband light from the source 31. The system 30 accepts at each point on the flat field 33 only the wavelength of light corresponding with that point, i.e., if wavelength 13-r or 23-r of FIG. 1 or FIG. 2 had been focused at a position in a conventional system 10 or 20, then only a wavelength at a position will be accepted by the system 30 in reverse, and be focused only at the conventional entrance aperture 11 or 21, which becomes the exit aperture 34 of the invention.

Hence, the system 30 recombines all wavelengths present at the former focal plane, now the flat field 33, into a single beam at the new exit aperture 34.

Figure 4A:
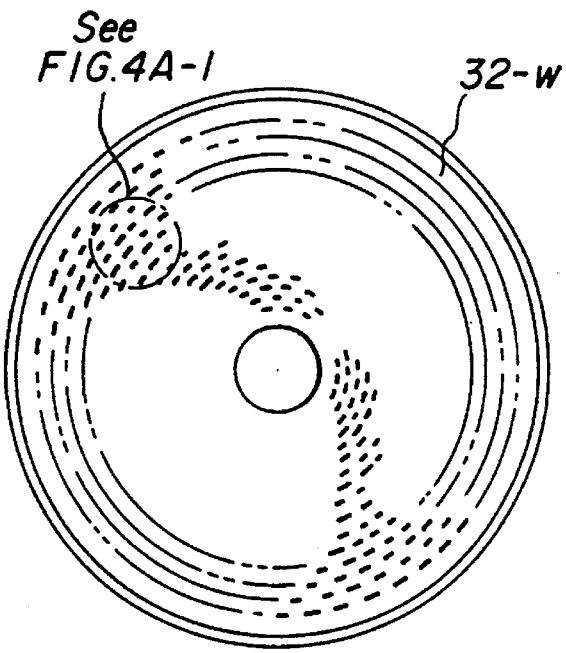
FIG. 4A is schematic diagram of chopping wheel in accordance with the invention for the spectrometer of FIG. 3.
Figures 1, 4A:
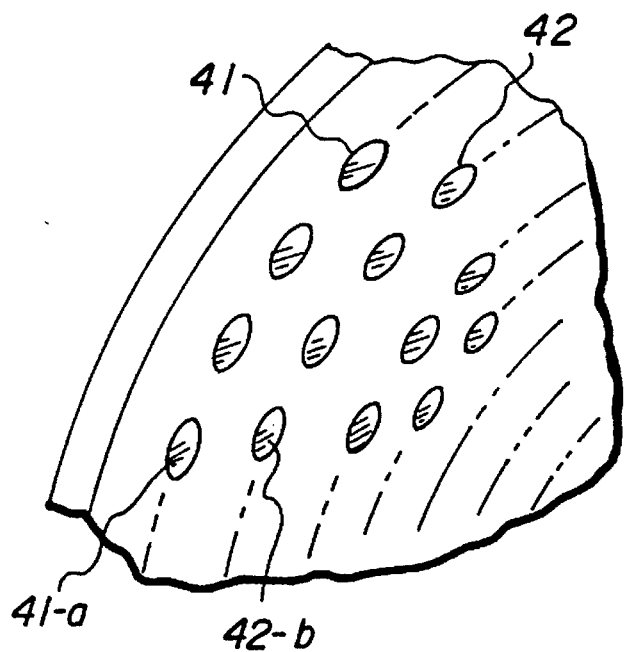

The modulator, such as the chopper wheel 32-w, is placed at the former focal plane, now the flat field 33, so that, as shown in FIG. 4A, a set of apertures, each of a width equal to an array pixel (single detector) is spaced in a row close together after the fashion of an array detector.

In particular, FIG. 4A includes a plurality of concentric rows, of which rows 41 and 42 are shown in detail. Each wavelength position of apertures, i.e. or the rows 41 and 42, has a different number of apertures per revolution as the chopper wheel 32-w rotates. Consequently, each wavelength arrives at the exit aperture 34 of FIG. 3 modulated at a different frequency. As a result, a relatively inexpensive single detector 35 is placed at the new exit aperture 34. The combined signal is demodulated into separate wavelength signals using a standard synchronous or fast Fourier transform demodulator 36. Harmonics are avoided by structuring each chopper aperture, such as the apertures 41-a and 42-a of FIG. 4A to generate a pure sine wave as it passes over the associated flat field. This eliminates any cross talk due to chopping harmonics and allows a greater selection of the number of apertures and chopping frequencies.

Figure 4B:
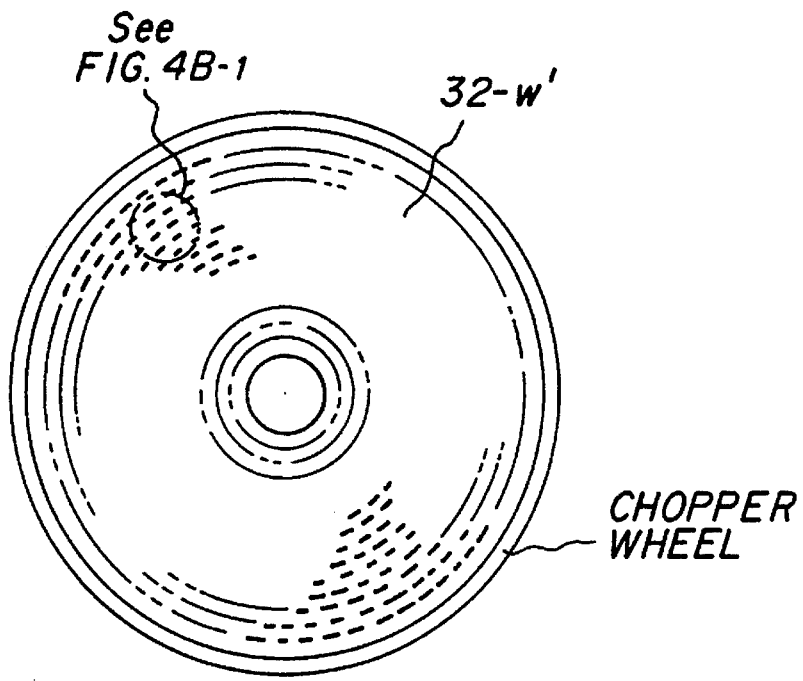
FIG. 4B is schematic diagram of an alternative chopping wheel in accordance with the invention for the spectrometer of FIG. 3.
Figures 1, 4B:
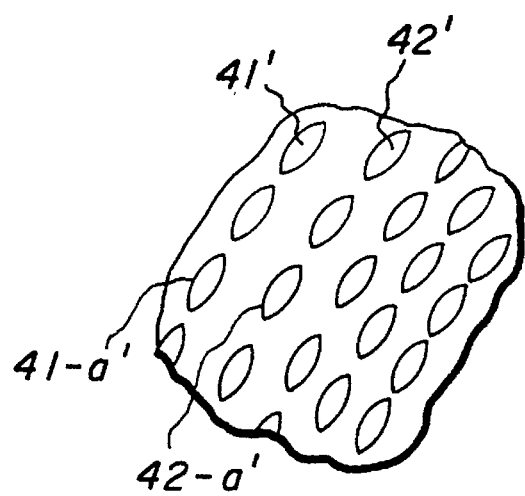

In order to provide a "multiplexing" effect with noise reduction, the alternative embodiment of FIG. 4B is provided in which the plurality of concentric rows in FIG. 4A is replaced by a spiral of equal-sized apertures 41'. This is by contrast with the reduced sized apertures in each succeeding, inward row, such as for the rows 41 and 42 shown in detail in FIG. 4A. Each wavelength position of the apertures 41' has a different radius, so that while the size remains the same for each aperture 41' the inwardly spiral positioning produces a frequency change with complete multiplexing that achieves noise reduction. This is by comparison with non-signal noise intervals between successive choppings for the wheel of FIG. 4A. Because of the equal sizes and inward spiraling of the apertures 41' there are virtually no non-signal noise intervals for the embodiment of FIG. 4B. Consequently, each wavelength arrives at the exit aperture 34 of FIG. 3 modulated at a different frequency with a significant noise reduction. As a result, a relatively inexpensive single detector 35 is placed at the new exit aperture 34. The combined signal is demodulated into separate wavelength signals using a standard synchronous or fast Fourier transform demodulator 36. Harmonics again are avoided by structuring each chopper aperture 41' of FIG. 4B to generate a pure sine wave as it passes over the associated flat field. This also eliminates any cross talk due to chopping harmonics and allows a greater selection of the number of apertures and chopping frequencies.

Figure 5:
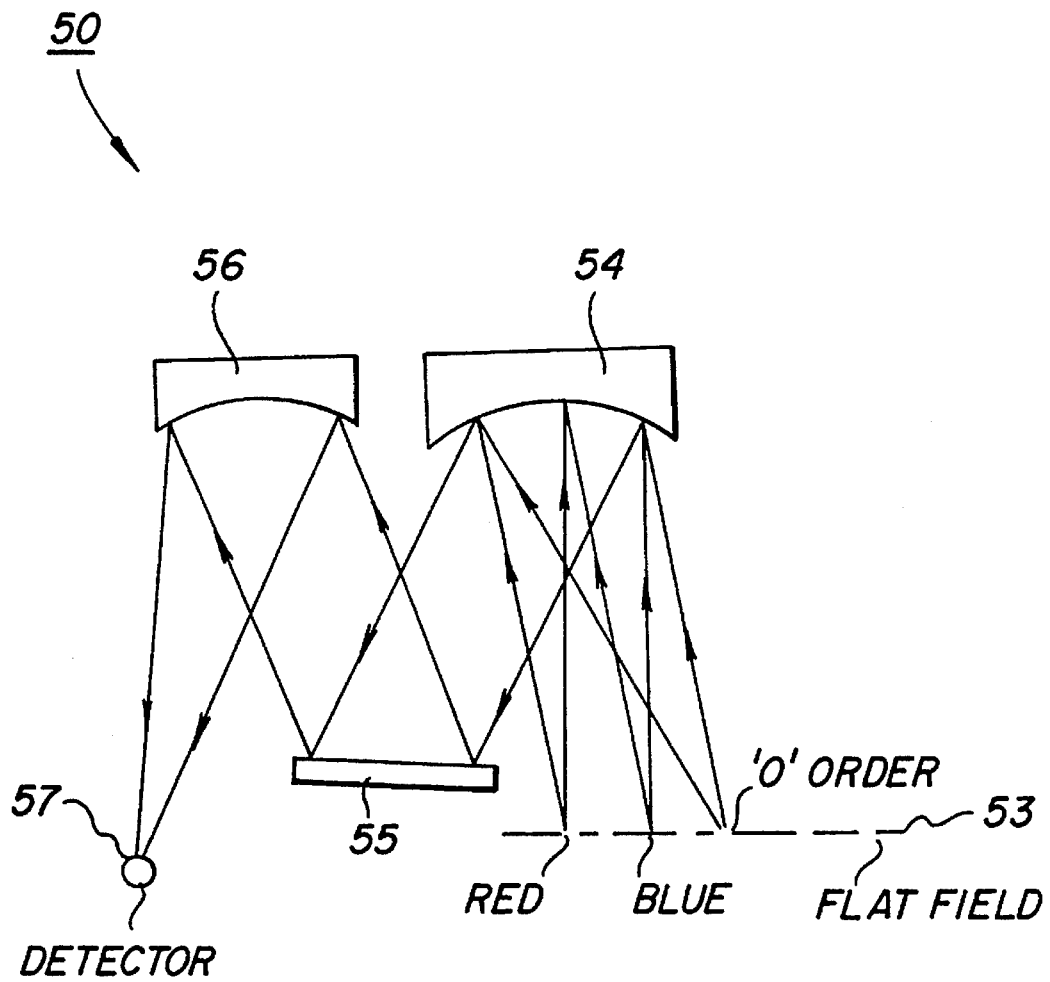
FIG. 5 is a schematic diagram of an illustrative plane grating system of the prior art for use in the spectrometer of FIG. 3.

In place of the grating 34, the invention can make use of plane ruled grating system 50 of the kind shown in FIG. 5. The system 50 is of the Czerney-Turner type with a flat focal plane 53 that serves as the flat field 33 of FIG. 3. The spectral components from the field 53 are collected and collimated by a mirror 54 which illuminates a ruled grating 55, then to a focusing mirror 56 which reverses collimation and focuses the spectral components at the detector position (exit) 57 (corresponding to position 35 in FIG. 3).

Thus the invention permits multiplexing to be achieved with a standard plane grating spectrometer where light is admitted from a source through a small aperture, and a mirror or lens then collimates the light before illuminating a plane grating that initially disperses the spectrum largely onto a focusing mirror, followed by focussing onto a flat focal plane. The advantage of an array detectors is achieved with a plane grating spectrometer, but without the disadvantage of covering only small segments of the total spectrum.

The foregoing description is illustrative only, and other aspects, adaptations and modifications of the invention will apparent to persons of ordinary skill in the art.

What is claimed:

1. Apparatus for analyzing energy emanating from a source, which comprises chopper modulator means comprising an apertured, rotatable member with apertures proportioned to generate sinusoidal signals for converting energy from said source into spectral components distributed according to frequency along a flat field;

means for combining said spectral components into a beam;

means for detecting said beam combining said spectral components; and means for demodulating said spectral components.

2. Apparatus as defined in claim 1 wherein said means for combining said spectral components into a beam comprises a ruled grating.

3. Apparatus as defined in claim 1 wherein the demodulating means for said beam combining said spectral components comprises a fast Fourier transform demodulator.

4. Apparatus as defined in claim 1 wherein the demodulating means for said beam combining said spectral components comprises a synchronous demodulator.

5. Apparatus as defined in claim 1 wherein said modulator means has a radius and a set of apertures of width equal to an array pixel (single detector) spaced in a row, with a different number of apertures per revolution at different radial positions as said modulator rotates.

6. Apparatus as defined in claim 1 wherein said modulator means is an apertured chopper at a focal plane of said energy from said source, with harmonic avoidance by having each chopper aperture structured to generate a pure sine wave as said chopper aperture passes over an associated focal plane aperture.

7. A method of using an optical system, characterized by reversibility and having a focal plane, for analyzing energy emanating from a source, which comprises using the reversibility of said optical system and illuminating said focal plane with homogeneous, broad-band light from said source; further including placing an apertured modulator at said focal plane, with said modulator having a radius and a set of apertures of width equal to an array pixel (single detector) spaced in an array detector row, and further providing a different number of apertures per revolution at different radial positions as said modulator rotates.

8. A method of claim 7 wherein said light has a band of wavelengths and said focal plane has a plurality of separate points for different wavelengths of light further including accepting at each point on said focal plane only the wavelength of light corresponding with that point, so that each accepted wavelength will be focussed only at an exit corresponding to an entrance aperture.

9. A method of claim 7 further including recombining all wavelengths present at said focal plane into a single beam at an exit aperture.

10. A method of claim 7 further including placing a modulator such as a chopper wheel at said focal plane so that a set of apertures of width equal to an array pixel (single detector) is spaced close together in an array detector row.

11. A method of claim 7 wherein said light has a band of wavelengths and each wavelength arrives at an exit aperture modulated at a different frequency, and a single frequency-responsive detector is placed at the exit aperture.

12. The method of claim 7 further including demodulating said energy into separate wavelength signals using synchronous demodulation.

13. A method of claim 7 further including eliminating cross talk due to said chopping harmonics.

14. A method of using an optical system, characterized by reversibility and having a focal plane, for analyzing energy emanating from a source, which comprises using the reversibility of said optical system and illuminating an apertured chopper at said focal plane with homogeneous, broad-band light from said source; further including harmonic avoidance by structuring each chopper aperture to generate a pure sine wave as it passes over an associated focal plane aperture.

15. A method of claim 14 further including converting said energy from said source into spectral components distributed according to frequency along a flat field.

16. A method of claim 14 further including converting said energy from said source into spectral components distributed according to frequency along a flat field by an apertured, rotatable member.

17. A method of claim 14 wherein said harmonic avoidance further includes eliminating cross talk.

* * * * *